May 14, 1929.　　　O. L. EGLOFF　　　1,712,653
TEMPERATURE INDICATING DEVICE
Filed April 16, 1923　　2 Sheets-Sheet 1
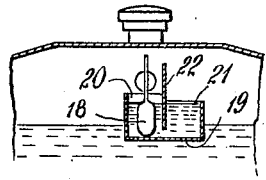
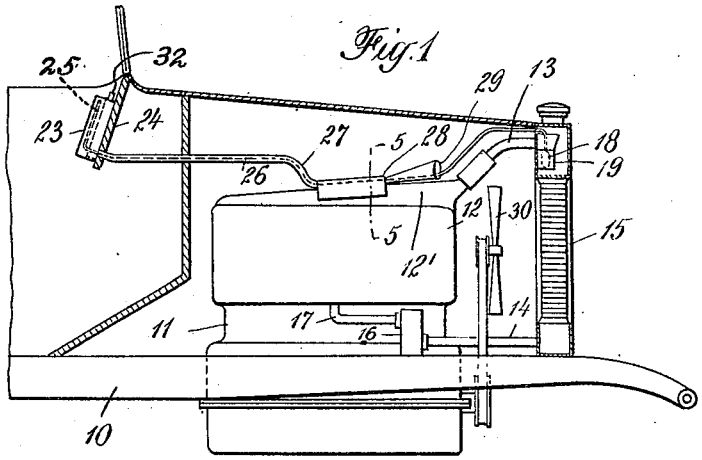
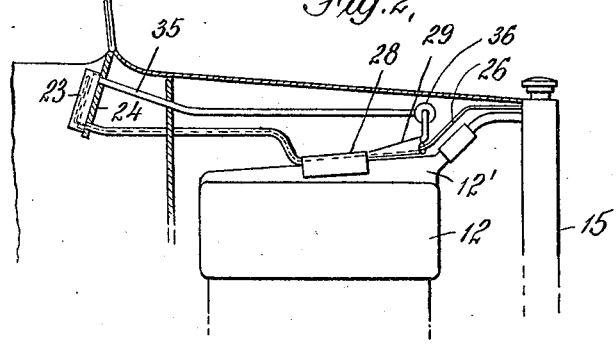
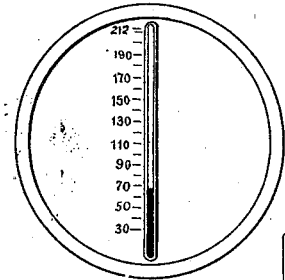
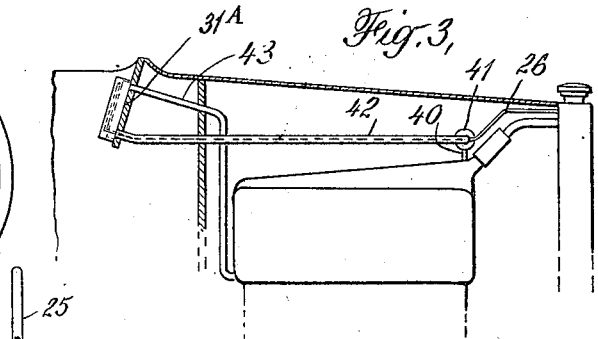
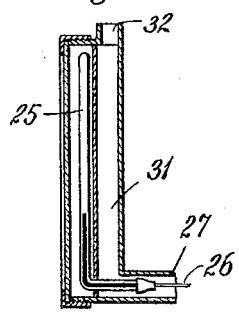
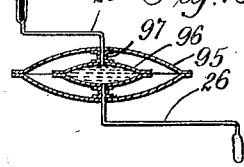
INVENTOR
Otto L. Egloff
E. W. Marshall
ATTORNEY

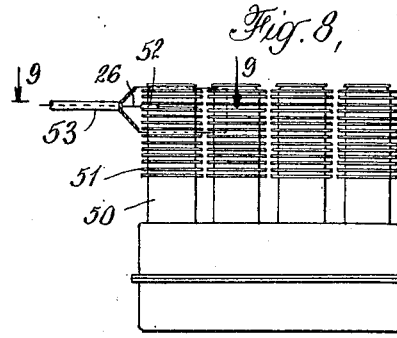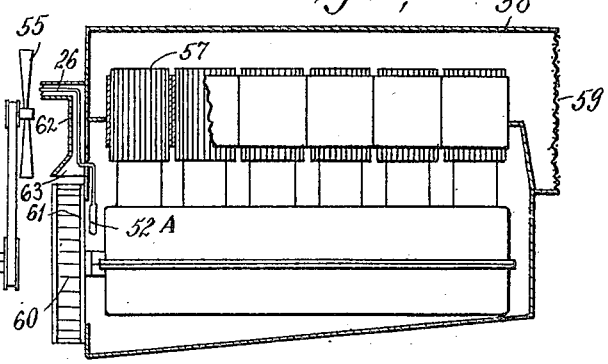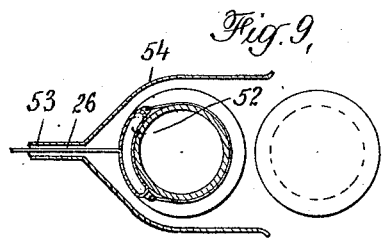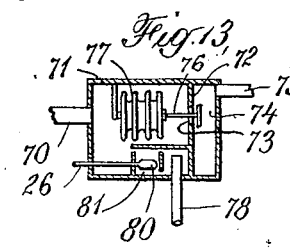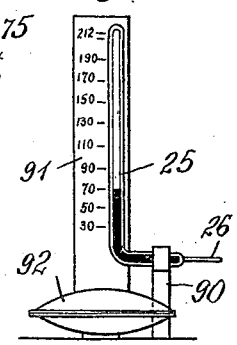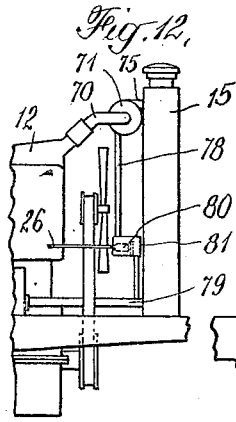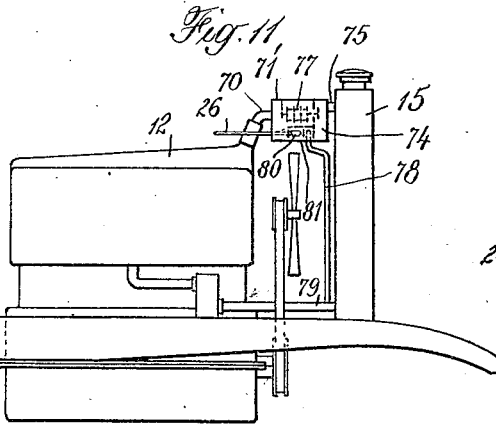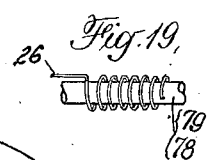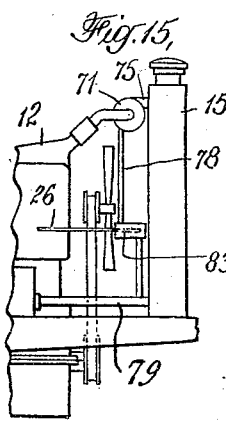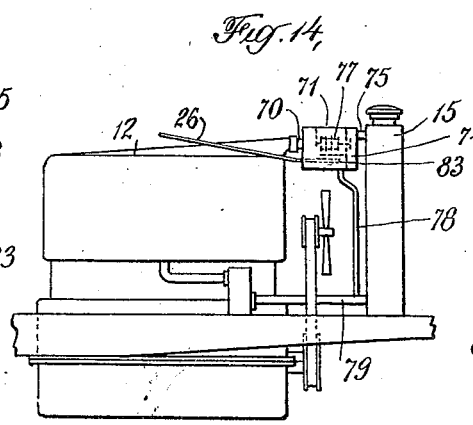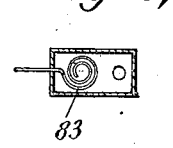

Patented May 14, 1929.

1,712,653

UNITED STATES PATENT OFFICE.

OTTO L. EGLOFF, OF NEW YORK, N. Y.

TEMPERATURE-INDICATING DEVICE.

Application filed April 16, 1923. Serial No. 632,217.

This invention relates to temperature indicating devices.

Although the invention is capable of general application and may be used wherever temperature indicating means is desirable or necessary, it is particularly adapted for use with internal combustion engines to indicate the condition of operation or the temperature of the engine.

One of the objects of the invention is to provide temperature indicating means that will be accurate under all conditions encountered.

Another object of the invention it to provide a device adapted for use with different types of engines such for instance as liquid cooled or air cooled engines.

Another object of the invention is to provide a temperature indicating device so constructed as to automatically compensate for changes in the temperature of the atmosphere in which the device is used whereby the temperature reading will be correct under varied conditions of atmospheric temperature.

Further objects of the invention will appear from the following description taken in connection with the drawings which form a part of this application and in which, Fig. 1 is an elevational view, partly in section, showing an internal combustion engine and a temperature indicating device used in connection therewith and constructed in accordance with the invention.

Fig. 2 is an elevational view similar to Fig. 1 but showing a slightly modified form of construction for insuring the correct temperature reading.

Fig. 3 is a view similar to Figs. 1 and 2 but showing another form of construction.

Fig. 4 is an elevational view taken at right angles to Fig. 1 and showing the well in the radiator in which the temperature responsive element is located.

Fig. 5 is a sectional elevation taken substantially on line 5—5 of Fig. 1.

Fig. 6 is an enlarged vertical sectional elevation showing the temperature indicating means or thermometer.

Fig. 7 is an elevational view taken at right angles to Fig. 6 showing the thermometer.

Fig. 8 is an elevational view of an air cooled engine having cylinder cooling ribs or vanes on the cylinders and illustrating the temperature responsive element mounted thereon.

Fig. 9 is an enlarged sectional elevation taken substantially on line 9—9 of Fig. 8.

Fig. 10 is a sectional elevation of another type of air cooled engine having an enclosed cooling system and showing the temperature responsive element mounted thereon.

Fig. 11 is an elevational view of a liquid cooled engine having a thermostat control valve between the liquid jacket and radiator and showing the temperature responsive element mounted in connection therewith.

Fig. 12 is a view similar to Fig. 11 but showing the temperature responsive element mounted in the by-pass from the thermostat to the liquid jacket intake conduit.

Fig. 13 is an enlarged sectional elevation of the thermostat control valve shown in Fig. 11.

Fig. 14 is a view similar to Fig. 11 but showing the temperature responsive element located in another position in the liquid cooling system and showing a different form of temperature responsive element.

Fig. 15 is a view similar to Fig. 14 but showing the temperature responsive element mounted in the by-pass between the thermostat and the liquid jacket intake.

Fig. 16 is an enlarged sectional elevation showing the mounting of the temperature responsive element illustrated in Figs. 14 and 15.

Figs. 17 and 18 illustrate other forms of compensating means for automatically compensating for changes in the atmospheric temperature in which the temperature indicating device is used, and Fig. 19 illustrates another way of attaching the particular form of temperature responsive element.

The invention briefly described consists of means for indicating to the operator of a motor vehicle or other engine, the actual temperature of the engine. The device has been illustrated both in connection with air cooled and liquid cooled engines and in the air cooled type the heat responsive element or temperature responsive element is mounted either in a position close to the cylinder and preferably between the radiating vanes or fins which surround the cylinder, or in the path of the heated air coming from the cylinders. In the liquid cooled type of engine the temperature responsive element is positioned in the liquid system either in the intake end of the radiator or in other embodiments in the by-pass between the thermostat control valve and the liquid intake conduit of the engine jacket or in the thermostat casing. Since the temperature responsive element is located at some distance from the indicating means, the latter will not only be influenced by varying temperatures acting upon the temperature responsive element but also by temperature variations of the atmosphere, thereby causing an error in the temperature indication, because said temperature variations of the atmosphere will cause expansion or contraction of the fluid contained in the temperature indicating means and in the connecting tube therefrom to the temperature responsive element. Therefore means is provided for preventing atmospheric temperatures from acting upon the indicating means and connecting tube therefrom to the temperature responsive element. This is accomplished in certain embodiments by surrounding the indicating means and the connecting tube with warm air or other fluid. In another form of the invention the effects of the different temperatures of the atmosphere in which the device is used are compensated for by providing for relative movement between the thermometer tube and the scale on which the temperature is indicated, one of these parts having its position automatically regulated by the temperature of the atmosphere. In another form of the invention this is done by an automatic correction of the quantity of the fluid contained in indicating means. Further details of the invention will appear from the following description.

Referring to Fig. 1 the invention is illustrated in connection with a motor vehicle chassis having a frame 10, a motor 11 provided with a liquid jacket 12 connected by conduits 13 and 14 to a radiator 15. The cooling liquid for the motor passes from the liquid jacket to the radiator through the conduit 13 and from the radiator through the conduit 14 to a pump 16 and thence through a conduit 17 back into the jacket.

It is customary with the common type of temperature indicating device to position the heat responsive element or the element responsive to changes in temperature in the space above the body of liquid in the radiator and to thus subject this element to the vapor or steam above the body of the liquid. In this invention, however, the temperature indicating device is intended to indicate the actual temperature of the circulating liquid and with this object in view the bulb or temperature responsive element 18 is positioned in a well or receptacle 19 mounted in the radiator. The receptacle 19 is divided into two sections 20 and 21 by a baffle plate 22, as shown in Fig. 4. The section 21 of the receptacle 19 is so disposed as to receive the liquid discharged from the jacket through the conduit 13 and since the bulb 18 is positioned in the section 20 this element is directly in the path of the incoming liquid and the liquid must pass around the baffle plate 22. The element 18 therefore is exposed to a continuous stream of liquid passing into the radiator from the liquid jacket of the engine.

From the foregoing description it will be seen that the temperature responsive element is so located as to be acted upon by the temperature of the cooling medium and is positioned in the path of circulation of this medium. By so locating this element steam or vapor in the system can not gain access thereto and thereby give an erroneous impression as to the temperature of the cooling medium.

In the particular embodiments of the invention illustrated the thermometer or indicating device 23 is mounted on the instrument board 24 of the vehicle and comprises a glass tube 25 (Fig. 6) which is connected by a preferably metallic tube 26 of small diameter to the temperature responsive element 18. The connection between the tube 26 and the tube 25 may be made in any desired manner but these elements are preferably welded together and the metal at the joint is so chosen that the coefficient of expansion of the metal such as platinum and the glass will be substantially the same. Any desired fluid may be used in the tubes 25 and 26 and element 18.

As shown in Fig. 1 the tube 26 extends around the top of the motor from the radiator to the instrument board and it will be readily seen that exposing this relatively long length of tubing and the indicating tube 25 to the temperature variations of the surrounding atmosphere would cause an error in the desired temperature indication. In order to prevent this error means has been provided for insulating the tubes 26 and 25 from the surrounding atmosphere and for maintaining these tubes in heated condition.

In the embodiment of the invention shown in Fig. 1 this object is attained by means of a tubular casing 27 which surrounds the tube 26 throughout the major portion of its length. The casing 27 is formed with an enlarged portion 28 positioned as shown in Fig. 5 over and upon the discharge manifold 12' of the liquid jacket 12 and this portion 28 of the casing has a bell shaped or flaring extension 29 extending toward the radiator.

When the motor shown in Fig. 1 is running air will be forced into the extension 29 by the fan 30 and will be heated as it passes through the portion 28 of the casing 27. This heated air by surrounding the tube 26 and flowing through chamber 31 (Fig. 6) will maintain the connecting tube 26 and the indicating tube 25 in a heated condition, thus preventing error in temperature indication. As shown in Fig. 6 the end of the casing 27 terminates in or communicates with a chamber or casing 31 disposed adjacent the tube 25 and having an outlet opening 32 at its upper end.

In Fig. 2 means is provided for effecting a continuous circulation of warm air or other suitable fluid. This is accomplished by providing a return conduit 35 from the chamber 31 to the front end of the flared extension 29 of the casing 28. A pump 36 is shown as mounted in the return conduit 35 for maintaining the circulation.

The afore described purpose illustrated in Figs. 1 and 2 may also be attained as shown in Fig. 3. In this embodiment liquid is extracted from the liquid jacket through a conduit 40 by a pump 41 and is discharged by the pump into a conduit 42 which surrounds the tube 26 for the major portion of its length. This liquid passes through the chamber 31A and is returned therefrom to the liquid jacket through a conduit 43.

The temperature indicating device is equally well adapted for use with air cooled motors and in Figs. 8-10 inclusive applications are shown of the device to this type of motor.

In Fig. 8 the cylinders 50 of the motor are shown as provided with horizontal, laterally extending radiating vanes or fins 51. The heat responsive element or bulb 52 is mounted between two adjacent radiating fins and the tube 26 which is connected to the element 52 is surrounded by a casing 53 having an extension 54 embracing a portion of one of the cylinders 50. As air is forced by the fan 55 over the outer surface of the cylinders a portion of this air will be forced toward the extension 54 into the casing 53 thus maintaining the connecting tube 26 and the indicating tube 25 in a heated condition as hereinbefore described.

In Fig. 10 another form of air cooled motor is shown with an enclosed cooling system. In this instance the heat responsive element 52A is disposed near the exhaust opening of said cooling system. In this form of motor a casing 58 partially surrounds the motor and has an air inlet 59 at its front end, the air being drawn through the casing by fan blades 60 formed in the fly wheel 61. The tube 26 is surrounded as in the preceding embodiments by a casing 62 having an intake conduit 63 placed over the fly wheel 61 and receiving heated air thereby.

In each of the preceding embodiments of the invention the casing surrounding the connecting tube should preferably be formed of or lined with heat insulating material so as to retain the heat therein.

In Figs. 11-16 inclusive, the temperature indicating device is illustrated in connection with thermostatically controlled water circulation systems. In such systems as is well known, a thermostatic valve is interposed between the discharge conduit from the water jacket and the intake to the radiator and a by-pass is provided from the thermostatic valve chamber to the radiator discharge conduit.

Since thermostatic valves may not function properly at all times and may become clogged and it being desired to know the temperature of the liquid in the jacket the temperature responsive element of the temperature indicating device is not positioned in the radiator as shown in Figs. 1 and 4 but in the embodiments of the invention shown in Figs. 11 and 14 the temperature responsive element is located in the thermostat casing 71, or as shown in Figs. 12 and 15 the temperature responsive element is located in the radiator by-pass 78, leading from the thermostat to the liquid return conduit 79.

Referring to Fig. 11 the liquid jacket 12 of the motor is provided with a discharge conduit 70 which communicates with a casing 71 (see Fig. 13) of a thermostat valve. The casing 71 has formed therein a partition 72 having a port 73 leading into the chamber 74 which in turn communicates with a conduit 75 connected at its opposite end to the radiator 15. The valve 76 is mounted in the casing 71 and is controlled by a metallic thermostat bellows 77 of a well known construction in such a manner that when the liquid in the system is cool the valve 76 will be closed and the liquid will pass from the casing 71 through a radiator by-pass conduit 78 into the radiator discharge conduit 79. When, however, the liquid in the jacket has become sufficiently heated to require cooling the thermostatic bellows 77 will open the valve 76 thereby permitting the major portion of the cooling water to pass through the conduit 75 to the radiator.

As shown in Figs. 11 to 13 inclusive the temperature responsive element 80 is mounted in a casing 81 similar to the casing 19 shown in Fig. 4.

Heretofore the temperature responsive element has been shown in the form of a bulb, but it may be of any other desired form or shape, for instance, such as a flat tubular spiral 83 as shown in Fig. 16. This kind of temperature responsive element is used in the embodiments of the invention as shown in Figs. 14 and 15, being positioned below the level of the hottest part of a motor cylinder.

As part of the liquid passing through conduit 70 will always flow through the by-pass 78 it will be seen from Figs. 11-15 inclusive that the temperature indicating device will indicate the temperature of the cooling liquid at all times whether the thermostat valve 76 leading to the radiator is open or not.

The kind of temperature responsive element, in the form of a long tube of small diameter may also be exposed to the temperature desired to be measured by winding this tube around cylinders 50 or around conduits 78 or 79 for instance as shown in Fig. 19.

Instead of maintaining the connecting tube 26 and the temperature indicating means in a heated condition to prevent atmospheric temperature variations from affecting same, thus insuring a correct indication of the temperature to be measured, this object may be accomplished by means of a construction such as that illustrated in Fig. 17. In this figure the glass thermometer tube 25 is mounted in the fixed bracket 90 and the temperature indicating scale 91 which is positioned behind the tube 25 is supported on an expansible device 92 responsive to changes in temperature. The device 92 illustrated consists of an expansible and contractible bellows which may contain air or any other suitable fluid. Changes in temperature will cause the fluid to expand or contract, thus causing the bellows to expand or contract, correspondingly changing the location of the scale 91. As the temperature of the atmosphere varies the scale 91 will be automatically raised or lowered in accordance with the change in temperature. Errors in the height of the indicating fluid caused by changes in temperature will therefore be automatically compensated for. In connection with this form of the invention it will be understood that either of the elements 25 or 91 may be movable or fixed.

Another way of insuring correct temperature indication is illustrated in Fig. 18. In this case the expansible device is inserted in the connecting tube 26. The expansible member 96 is positioned in and fastened by stems 97 to a casing 95. The tube 26 goes through stems 97.

Temperature variations will expand or contract the member 95 thereby influencing the casing 96, which by expanding and contracting will either deduct from or add to the height of fluid in tube 25. In this case the expansion or contraction of the fluid in the outer bellows 95 will cause bellows 96 to expand or contract, thus lowering or raising the height of the fluid in tube 25. Errors in temperature indications therefore will be automatically corrected.

The afore described inventions may also be used in combination or in connection with temperature indicating devices other than glass tube thermometers.

Although certain specific embodiments of the invention have been illustrated and described, it will be understood that the invention is capable of further modification and that changes in the construction and in the arrangement of the various cooperating parts may be made without departing from the spirit or scope of the invention as expressed in the following claims.

What I claim is:

1. The combination with a fluid cooling system of a vehicle propelling internal combustion engine and temperature responsive means associated with said system, of means associated with said responsive means, for indicating the temperature of the cooling fluid, and compensating means for maintaining said indicating means at substantially the temperature of said fluid.

2. The combination with a fluid cooling system of a vehicle propelling internal combustion engine and temperature responsive means associated with said system, of means connected to said responsive means for indicating the temperature of the cooling fluid, and compensating means for maintaining said indicating means at a temperature differing from that of surrounding medium.

3. The combination with a fluid cooling system of a vehicle propelling internal combustion engine, of a device for indicating the temperature of the cooling fluid, said device comprising a temperature responsive element and temperature indicating means remote therefrom and an operative connection therebetween, and means for maintaining said indicating means at substantially the temperature of said fluid.

4. The combination with a liquid cooling system of a vehicle propelling internal combustion engine, of a device for indicating the temperature of the cooling liquid, said device comprising a temperature responsive element and temperature indicating means remote therefrom and an operative connecting means therebetween, and means for maintaining at least one of said aforementioned means at substantially the temperature of said liquid.

5. The combination with a fluid cooling system of a vehicle propelling internal combustion engine, of a device for indicating the temperature of the cooling fluid, said device comprising a temperature responsive element positioned in the stream of said fluid and temperature indicating means remote therefrom and an operative connecting means therebetween, and means for maintaining at least one of said aforementioned means at a temperature differing from that of surrounding medium.

6. The combination with a cylinder of a vehicle propelling internal combustion engine, of a temperature indicating device comprising a temperature responsive element responsive to the temperature of the fluid from around said cylinder, temperature indicating means connected to said responsive element, and means to maintain the temperature of the indicating means at substantially the temperature of the cooling fluid of said cylinder.

7. The combination with a cylinder of a vehicle propelling internal combustion engine, of a temperature indicating device comprising a temperature responsive element responsive to the temperature of the fluid from around said cylinder, temperature indicating means connected to said responsive element, and means to maintain said indicating means at a temperature differing from that of surrounding medium.

8. The combination with a cylinder of a vehicle propelling internal combustion engine, of a temperature indicating device comprising a temperature responsive element responsive to the temperature of the fluid from around said cylinder, temperature indicating means remote therefrom and an operative connection between temperature responsive element and temperature indicating means, and means for maintaining said indicating means at substantially the temperature of the cooling fluid of said cylinder.

9. The combination with a cylinder of a vehicle propelling internal combustion engine, of a temperature indicating device comprising a temperature responsive element responsive to the temperature of the fluid from around said cylinder, temperature indicating means remote therefrom and an operative connecting means between temperature responsive element and temperature indicating means, and means for maintaining at least one of said aforementioned means at a temperature differing from that of surrounding medium.

10. The combination with a temperature indicating device comprising a temperature responsive element and temperature indicating means connected thereto, of means for maintaining said indicating means at substantially the temperature of said temperature responsive element.

11. The combination with a temperature responsive device and temperature indicating means associated therewith, of means for maintaining said indicating means at a temperature differing from that of surrounding medium.

12. The combination with a temperature indicating device, comprising a temperature responsive element and temperature indicating means remote therefrom and an operative connecting means therebetween, of means for maintaining at least one of said aforementioned means at substantially the temperature of said temperature responsive element.

13. The combination with a temperature indicating device, comprising a temperature responsive element and temperature indicating means remote therefrom and an operative connecting means therebetween, of means independent of said responsive element, for maintaining at least one of said aforementioned means at a temperature differing from that of surrounding medium.

14. The combination with a liquid cooling system of a vehicle propelling internal combustion engine, having a radiator, of a temperature indicating device, comprising a temperature responsive element, temperature indicating means remote therefrom and a fluid containing operative connection therebetween, said temperature responsive element being located out of contact with steam and in a position to be influenced by the temperature of the liquid below the level of the hottest part of the engine.

15. The combination with a liquid cooling system of a vehicle propelling internal combustion engine, of a temperature indicating device, comprising a temperature responsive element, temperature indicating means remote therefrom and an operative connection therebetween, said temperature responsive element being located in a position to be influenced by the temperature of the liquid below the level of the hottest part of the engine.

16. The combination with a liquid cooling system of a vehicle propelling internal combustion engine, having a radiator by-pass, a thermostat controlling said by-pass of a temperature indicating device, comprising a temperature responsive element, temperature indicating means remote therefrom and an operative connection therebetween, said temperature responsive element being located out of contact with steam in a position to be influenced by the temperature of the cooling liquid passing through said by-pass.

17. The combination with a liquid cooling system of a vehicle propelling internal combustion engine, having a radiator by-pass, of a temperature indicating device, comprising a coiled tube as temperature responsive element, temperature indicating means remote therefrom and an operative connection therebetween, said temperature responsive element being located below the level of the hottest part of an engine cylinder in a position to be influenced by the temperature of the cooling liquid passing through said by-pass.

18. A temperature indicating device comprising a temperature responsive element, a glass tube, containing fluid temperature indicating means, and a flexible operative connection from said temperature responsive element welded to said glass tube and means to maintain said tube at substantially the same temperature as said element.

19. A temperature indicating device comprising a temperature responsive element, a glass tube, containing fluid temperature indicating means, and a flexible operative connection from said temperature responsive element welded to said glass tube by means of a medium having substantially the expansion coefficient of glass and means to maintain said tube at substantially the same temperature as said element.

20. The combination with a cooling system of an internal combustion engine, of a temperature indicating device, comprising a glass tube, containing temperature indicating means, a temperature responsive element remote therefrom, and a flexible operative connection therebetween said connection being welded to said glass tube and means to maintain said connection at substantially the same temperature as said element.

21. The combination with an internal combustion engine, of a temperature indicating device, comprising a glass tube, containing temperature indicating means, a temperature responsive element remote therefrom, and a flexible operative connection therebetween said connection being welded to said glass tube and means to maintain said connection at substantially the same temperature as said element.

In witness whereof, I have hereunto set my hand this 12th day of April, 1923.

OTTO L. EGLOFF.